INVENTOR
TRUMAN FONTELL FLOCK
BY
ATTORNEYS.

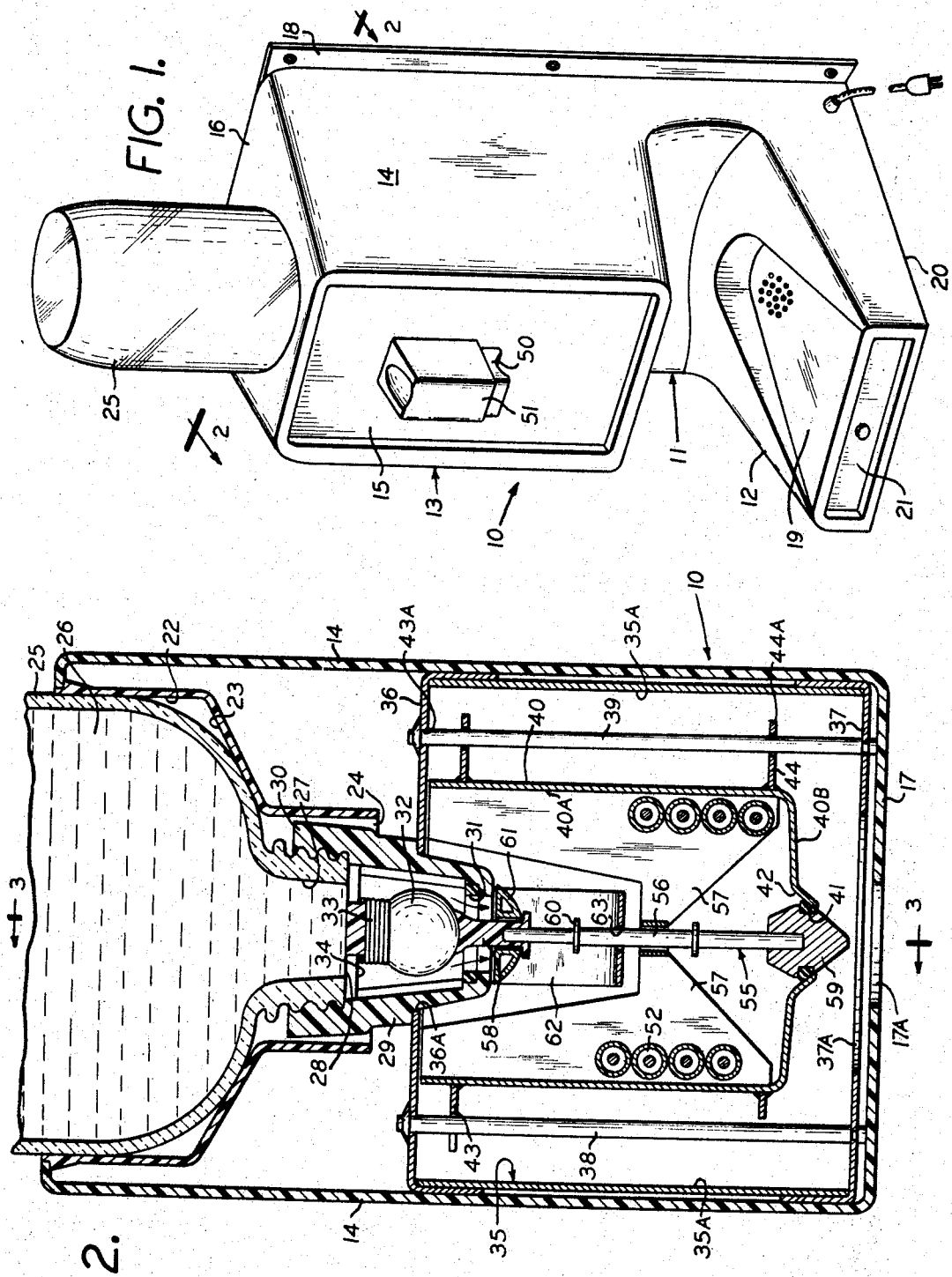

United States Patent Office 3,351,239
Patented Nov. 7, 1967

3,351,239
FLUID DISPENSING DEVICE
Truman Fontell Flock, Atlanta, Ga., assignor to Inst-O-Matic Corporation, Washington, D.C., a corporation of the District of Columbia
Filed June 18, 1962, Ser. No. 203,316
8 Claims. (Cl. 222—54)

This invention relates in general to a fluid dispenser, and more particularly to a fluid dispensing, metering and heating device.

It is an object of this invention to provide a liquid dispenser capable of metering a predetermined amount of liquid and thereafter heating the predetermined amount of liquid to a given temperature.

Another object is to provide a liquid dispenser in which a metered amount of liquid is automatically dispensed only after the metered amount has been heated to a predetermined temperature.

Still another object is to provide a liquid dispenser in which metering of the liquid from the liquid supply of the dispenser and the heating of the metered amount is initiated by relative movement between the receiving container and the liquid supply container.

Still another object is to provide a liquid dispenser in which the metering, and dispensing of the liquid from the liquid supply and heating of the same is automatically affected upon manual initiation of the operating cycle.

Still another object is to provide a liquid metering, heating and dispensing device that is relatively simple in construction and positive in operation.

In essence the above objects are attained in accordance with this invention by a liquid dispensing device comprising a stand on which there is inverted a reservoir container that has a mouth opening normally closed by a spring loaded valve means. A receiving container for receiving a measured or metered amount of the liquid is operatively disposed with respect to the reservoir container. In accordance with this invention the receiving container is provided with a bottom wall having a dispensing opening therein. The arrangement is such that one container is rendered movable relative to the other between operative and inoperative position. A valve actuator is operatively disposed between the respective containers so that in the operative position of the respective containers, the valve actuator functioning to close the dispensing opening of the receiving container and to open the reservoir valve to permit liquid to flow from the reservoir, the latter occurring after the former. The relative positions of the valved opening of the reservoir container and the receiving container is such that flow of liquid therebetween is automatically stopped in the operative position thereof by the liquid level in the receiving container sealing the mouth of the reservoir. Accordingly, latch means are provided for maintaining the respective containers in their operative relationship during the metering of the liquid.

Operatively associated with the receiving container is a heating means which is connected in a circuit with switch means for energizing the same in the operative position of the containers and for deenergizing the same in the inoperative position of the containers. Thermostatic means are also provided for disengaging the latch means when the metered amount of liquid has been heated to a predetermined temperature, whereupon the respective containers assume their inoperative relationship. In assuming their relative inoperative position, the heating means are deenergized, the reservoir valve closed, and the dispensing opening of the receiving container opened to permit discharge of the heated amount of liquid therefrom. In accordance with this invention a float valve means is operatively associated with the valve actuator for preventing the transfer of heat by convection to the reservoir during the heating of the liquid in the receiving container.

A feature of this invention resides in the provision whereby the relative movement between the respective receiving container and reservoir container initiates the metering and heating of the measured amount of liquid.

Another feature of this invention resides in the provision of a valving actuator carried by the receiving container to effect duo-valving of the dispensing opening in the bottom of the receiving container and the opening of the normally closed valved opening of the reservoir container.

Another feature of this invention resides in the provision of utilizing the liquid level of the metered amount of liquid for determining the quality of the measured amount of liquid to be heated.

Another feature resides in the provision of a float valve for minimizing the transfer of the heat from the receiving container to the liquid in the reservoir chamber by convection.

Another feature resides in the provision of a thermostatic element for determining the operation of the liquid dispensing device.

Other features and advantages will become more readily apparent when considered in view of the drawings and description, in which:

FIG. 1 is a perspective view of the dispensing device of this invention;

FIG. 2 is a partial sectional view taken along line 2—2 of FIG. 1; illustrating the respective containers in operative position.

Figure 3:
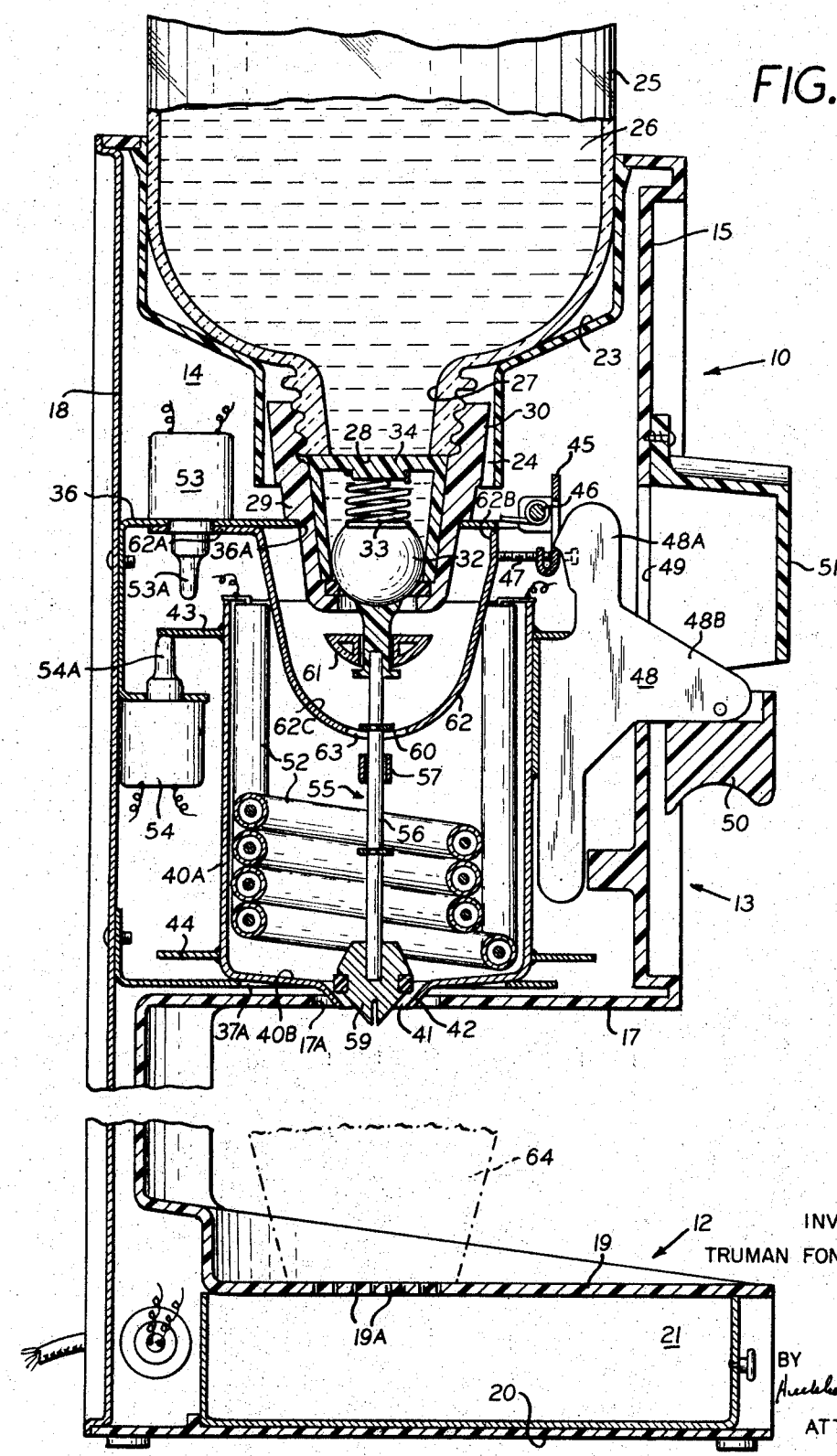
FIG. 3 is a sectional view taken through line 3—3 of FIG. 2, but showing the parts in their normal inoperative position.

Referring to the drawings, FIG. 1 illustrates the dispensing device 10 of this invention. The instant dispensing device 10 is particularly adapted for office, home, or restaurant use for making hot liquids such as coffee, tea, soup, hot chocolate and the like. The device comprises a stand 11 having a base portion 12 and an integrally connected upper housing portion 13. As shown, the upper housing 13 is defined by a pair of opposed side walls 14, front wall 15, top wall 16, bottom wall 17, and a back wall 18 that extends throughout the height of the dispensing device 10. The base portion 12 is spaced from the bottom wall 17 of the housing 13. In the illustrated embodiment the base portion 12 is defined by spaced top 19 and bottom wall 20. In the space between the top and bottom 19, 20 of the base portion 12 there is provided a removable drip pan 21, for collecting the dripping, as will be hereinafter described.

Formed in the top wall 16 of the upper housing portion 13 is a well 22 having inclined shoulder portions 23 terminating in a central opening 24. Supported within the well 22 is a reservoir container or bottle 25 adapted to contain a supply of water or other fluid 26. The bottle 25 has a neck portion 27 defining a mouth opening 28. As shown, the bottle 25 is supported in the well 22 in its inverted position.

Closing the mouth opening 28 of the bottle is a stopper 29 having a threaded skirt 30 by which the stopper 29 is screwed to the neck of the bottle. The end of the stopper 29 is provided with an opening 31 which is maintained normally closed by a ball valve 32. A spring 33 disposed between the ball valve 32 and an open grid plate 34 in the stopper 29 normally urges the ball valve 32 into sealing position.

Fixed within the housing 13 below the supply container 25 is a bracket 35 comprising a pair of vertically spaced plates 36 and 37 interconnected by a pair of opposed guide posts 38 and 39 and side supports 35A. Each of the bracket plates 36 and 37 have formed therein a central opening 36A, 37A respectively. The opening 36A in the top plate 36 is positioned to receive the tip portion of the stopper 29.

Disposed for vertical movement between the bracket plates 36 and 37 is a receiving container 40. In the illustrated embodiment the container 40 comprises a cup measure. However, it will be understood that the capacity of the container 40 may vary. As shown, the receiving container 40 comprises a cup having a tubular sidewall 40A and a bottom wall 40B formed with a dispensing opening 41 therein. The periphery of the opening 41 is defined by an inwardly and outwardly tapering lip 42 to define a valve seat. Laterally extending flanges 43, 44 are connected adjacent the upper and lower portions of the cup respectively. As shown in FIG. 2, the flanges 43, 44 are provided with aligned openings 43A, 44A for receiving the guide posts 38, 39. The arrangement is such that posts 38, 39 guide the vertical movement of the cup 40.

In the inoperative position, the container cup 40 is seated on the bottom bracket plate 37, the latter being provided with an opening 37A for receiving the lip portion 42 of the cup 40, as seen in FIG. 3. The bottom wall 17 of the housing is also provided with an opening 17A disposed in alignment with opening 37A. In the operative position the container cup 40 is disposed with its upper end disposed immediately below the upper bracket plate 36 and with bottom wall 40B spaced above bracket plate 37.

In accordance with this invention releasable means are provided for maintaining the receiving container 40 in the operative position as seen in FIG. 2. The releasable means comprise a spring biased sear 45 which is pivotally mounted about a hinge pin 46 to the upper bracket plate 36. Threaded to the lower end of the sear 45 is an adjusting screw 47. Connected to the cup 40 is a latch member 48 having a hook portion 48A extending beyond the upper end of the cup 40. Integrally connected to the latch member 48 is a laterally extending latch operator 48B which projects through a slotted opening 49 in the front wall 15 of the housing 13. A finger grip 50 may be connected to the extended end of the latch operator 48B, and a latch covering 51 is provided to conceal the slotted opening 49.

In operation the cup 40 is raised from inoperative position of FIG. 3 to operative position of FIG. 2 by simply exerting an upward force on the latch operator 48B until the hook portion 48A thereof latches the upper edge of the sear 45.

In accordance with this invention a valve actuator 55 is carried by the container cup 40. As shown, the valve actuator 55 comprises a shaft 56 loosely supported in upright position within the cup 40 by suitable guide supports 57 fixed to the walls of the container 40. Connected to the upper end of the actuator shaft 56 is a plunger 58 adapted to engage the ball valve 32 in the operative position of the cup 40. Connected to the bottom of the shaft 56 is a conical valve member 59 for valving the dispensing opening 41 in the bottom of the cup 40. The arrangement and operation of the valve actuator 55 is such that in the inoperative position of the cup 40, a down stop 60 will limit the downward movement of the valve member 59 so that the dispensing opening 41 is maintained normally opened, as shown in FIG. 3. From the inoperative position the vertical movement of the cup 40 will first effect seating of the valve member 59 in the dispensing opening to seal the same, and to then effect vertical displacement of the ball plunger 58 to force the ball valve 32 inwardly of the stopper to open the mouth opening 31. Thus a supply of liquid 26 will be metered from the supply container 25 to the cup 40. The arrangement is such that the liquid will flow until the liquid level within the cup 40 seals the mouth opening 31.

A heater means 52 is disposed within the cup 40 for heating the liquid received therein. Connected in a suitable circuit with the heater means 52 are a pair of micro switches 53 and 54. Switch 53 is an "on switch" for energizing the heater 52, and it is positioned on the bracket plate 36 with its actuating plunger 53A in position to be actuated by the cup flange 43. Switch 54 is an "off switch" for deenergizing the heater means 52, and it is spaced from switch 53 so that its plunger 54A is also actuated by flange 43. The arrangement is such that in the inoperative position of the container or cup 40, flange 43 will actuate the "off switch" 54, and in the operative position of the cup 40 the flange 43 will actuate the "on switch" 53.

In its operative position, the cup 40 will actuate the "on" switch 53 of the heater 52, and as it is energized begin to heat up the liquid in the cup. To prevent the transfer of heat from the liquid cup 40 to the liquid 26 in the inverted bottle 25 by convection, a float valve 61 is disposed about the actuator shaft 56 below the opening 31 in the stopper 29. Thus the liquid level in the cup, as the cup fills, will cause the float valve 61 to rise and close the opening 31. In this manner any appreciable transfer of heat by convection to the liquid 26 in the bottle is prohibited.

In accordance with this invention, means are provided for automatically effecting both the termination of the heating of the liquid in the cup container 40, and the subsequent dispensing of the heated liquid therefrom. As shown in FIGS. 2 and 3 a thermostatic element in the nature of a U-shaped bi-metal strip 62 is provided. One end 62A of the bi-metal strip is fixed to the upper bracket plate 36. The other end 62B of the bi-metal element 62 is free and it is biased against the adjusting screw 47 in the sear 45. The latter is adjustable to control the degree of expansion required to effect the action of the sear 45 by the bi-metal element 62. Accordingly, the bight portion 62C of the element 62 is submerged in the liquid being heated. A slot 63 is formed in the bight portion 62C of the strip 62 to accommodate the valve actuator shaft 56. Thus, when the liquid has been heated to a predetermined temperature, the expansion of the bi-metal element's free end 62B will pivot the sear 45 counterclockwise, as viewed in FIG. 3, to release the latch hook 48A. With the latch 48 released, the weight of the liquid in the cup 40 will cause the cup to drop. In dropping the ball valve 32 is closed by the action of spring 33, and the downward movement of the actuator shaft 56 is limited by downstop 60 engaging the bi-metal element 62 to effect the opening of the dispensing opening 41 in the bottom 40B of the receiving cup or container 40. Also in dropping the cup 40 actuates the "off" switch 54 to deenergize the heater 52. To catch the heated liquid being dispensed from the cup 40 upon the release thereof through the dispensing opening 41, a receptacle 64 is supported beneath the aligned openings 37A and 17A in the lower bracket shaft 37 and bottom wall 17 of the housing, respectively.

If desired, the upper wall 19 of the base portion 12 is provided with perforations 19A for collecting any dripping upon the removal of the receptacle 64, the dripping being collected in the removable drip pan 21.

To repeat the operation, one needs only to move the cup container 40 from inoperative lowered position to its raised operative position.

From the foregoing description it will be apparent that the liquid dispenser is relatively simple in construction and positive in operation.

While the instant invention has been disclosed with reference to a particular embodiment, it is to be appreciated that the invention is not to be taken as limited to all of the details thereof as modifications and variations thereof may be made without departing from the spirit or scope of the invention.

What is claimed is:

1. In a machine of the class described, a cup having an inlet and an exit through which liquid passes into and out of said cup, means for selectively closing said inlet and exit, heat responsive means disposed within the path of the liquid passing from said inlet into said cup and adapted to be submerged in said liquid when the liquid reaches a predetermined level in said cup, and detent means actuated by said heat responsive means for actuating said means for selectively closing said inlet and exit.

2. The machine of claim 1, wherein said heat responsive means comprises a U-shaped bimetal having the bight of the U disposed within said cup.

3. The machine of claim 1, wherein said cup is vetrically movable, and said means for selectively closing said inlet and exit is actuated by the movement of said cup.

4. In a device of the class described, a housing, a bottle carried in an inverted position by said housing, a check valve in the mouth of said bottle which opens upon being moved inward thereof, a cup within said housing below said bottle, said cup being movable in a vertical path toward and away from said bottle, the mouth of said bottle protruding into said cup when said cup is in its raised position for feeding liquid into said cup to a prescribed level defined by said mouth of said bottle when said check valve is opened, valve means for opening said check valve when said cup is raised, valve means in said cup for discharging said cup when said cup is in a lowered position, latch means for releasably holding said cup in its raised position, and means for releasing said latch including heat responsive means disposed within the path of liquid passing from said bottle into said cup.

5. The machine of claim 4, wherein said heat responsive means comprises a U-shaped bimetal having the bight of the U disposed within said cup.

6. The machine of claim 5, wherein one leg of said U-shaped bimetal is fixed relative to said housing, said latch means includes a sear pivotally mounted on said housing for movement between a latching and a non-latching position, spring means for biasing said sear into operative engagement with the other leg of said bimetal, and a hook means fixed to said cup and engageable with said sear for latching said cup in the raised position when said sear is in its latching position.

7. The machine of claim 6, wherein the operative engagement of said sear with said bimetal is effected by an adjustable screw threadedly mounted on said sear.

8. In a machine of the class described, a cup having an inlet and an exit through which liquid passes into and out of said cup, means for selectively closing said inlet and exit, heat responsive means disposed within said cup and adapted to be submerged in said liquid when the liquid reaches a predetermined level in said cup, and detent means actuated by said heat responsive means for actuating said means for selectively closing said inlet and exit.

References Cited

UNITED STATES PATENTS

| | | | |
|---|---|---|---|
| 1,501,068 | 7/1924 | Schatz | 222—67 |
| 2,135,168 | 11/1938 | Cannon | 141—360 X |
| 2,415,861 | 2/1947 | Bauerlein et al. | 222—355 |
| 2,522,898 | 9/1950 | Sanborn | 222—354 X |
| 2,568,474 | 9/1951 | Van Sciven. | |
| 2,784,885 | 9/1955 | Kneisley et al. | 222—146 X |
| 2,829,583 | 4/1958 | Leonard | 99—305 X |
| 2,912,143 | 11/1959 | Woolfolk | 222—506 X |
| 2,926,234 | 2/1960 | Palmer | 99—305 X |
| 3,243,271 | 3/1966 | Garcia | 222—54 |

RAPHAEL M. LUPO, *Primary Examiner.*

LOUIS J. DEMBO, *Examiner.*

R. M. YOST, *Assistant Examiner.*